United States Patent
Fallourd et al.

(10) Patent No.: US 11,434,178 B2
(45) Date of Patent: Sep. 6, 2022

(54) COMPOSITIONS AND METHODS FOR STIMULATING PLANT GROWTH

(71) Applicant: MALTEUROP GROUPE, Reims (FR)

(72) Inventors: Marie-Jane Fallourd, Bezannes (FR); Sihame Chafil, Festieux (FR); Jean-Luc Baret, Leognan (FR)

(73) Assignee: MALTEUROP GROUPE, Riems (FR)

( * ) Notice: Subject to any disclaimer, the term of this patent is extended or adjusted under 35 U.S.C. 154(b) by 364 days.

(21) Appl. No.: 16/467,787

(22) PCT Filed: Dec. 8, 2017

(86) PCT No.: PCT/EP2017/082079
§ 371 (c)(1),
(2) Date: Jun. 7, 2019

(87) PCT Pub. No.: WO2018/104531
PCT Pub. Date: Jun. 14, 2018

(65) Prior Publication Data
US 2020/0239376 A1    Jul. 30, 2020

(30) Foreign Application Priority Data
Dec. 9, 2016 (EP) ..................................... 16306654

(51) Int. Cl.
*A01N 65/44* (2009.01)
*C05F 5/00* (2006.01)

(52) U.S. Cl.
CPC .............. *C05F 5/008* (2013.01); *A01N 65/44* (2013.01)

(58) Field of Classification Search
None
See application file for complete search history.

(56) References Cited

U.S. PATENT DOCUMENTS 6,387,146 B1    5/2002 Protzmann et al.

FOREIGN PATENT DOCUMENTS

| DE | 1 104 536 B | 4/1961 |
| DE | 44 24 574 A1 | 8/1995 |
| DE | 198 48 337 A1 | 4/2000 |
| JP | 3-7208 A | 1/1991 |

OTHER PUBLICATIONS

International Preliminary Report on Patentability for International Application No. PCT/EP2017/082079 dated Jun. 11, 2019.
International Search Report, dated Feb. 7, 2018, from corresponding PCT/EP2017/082079 application.
Written Opinion, dated Feb. 7, 2018, from corresponding PCT/EP2017/082079 application.
European Search Report and Written Opinion dated Mar. 22, 2017, from EP application No. 16 30 6654.1.
Database WPI; Week 199108, Thomson Scientific, London, GB; AN 1991-055547 XP002777775, & JP H03 7208 A (Yokoyama T) Jan. 14, 1991 (Jan. 14, 1991).

*Primary Examiner* — Alton N Pryor
(74) *Attorney, Agent, or Firm* — Nixon & Vanderhye

(57) ABSTRACT

Disclosed are malt sprouts fraction extracts, their process of preparation and their use as a biostimulant agent.

15 Claims, 4 Drawing Sheets

US 11,434,178 B2

COMPOSITIONS AND METHODS FOR STIMULATING PLANT GROWTH

DOMAIN OF THE INVENTION

Figure 1:
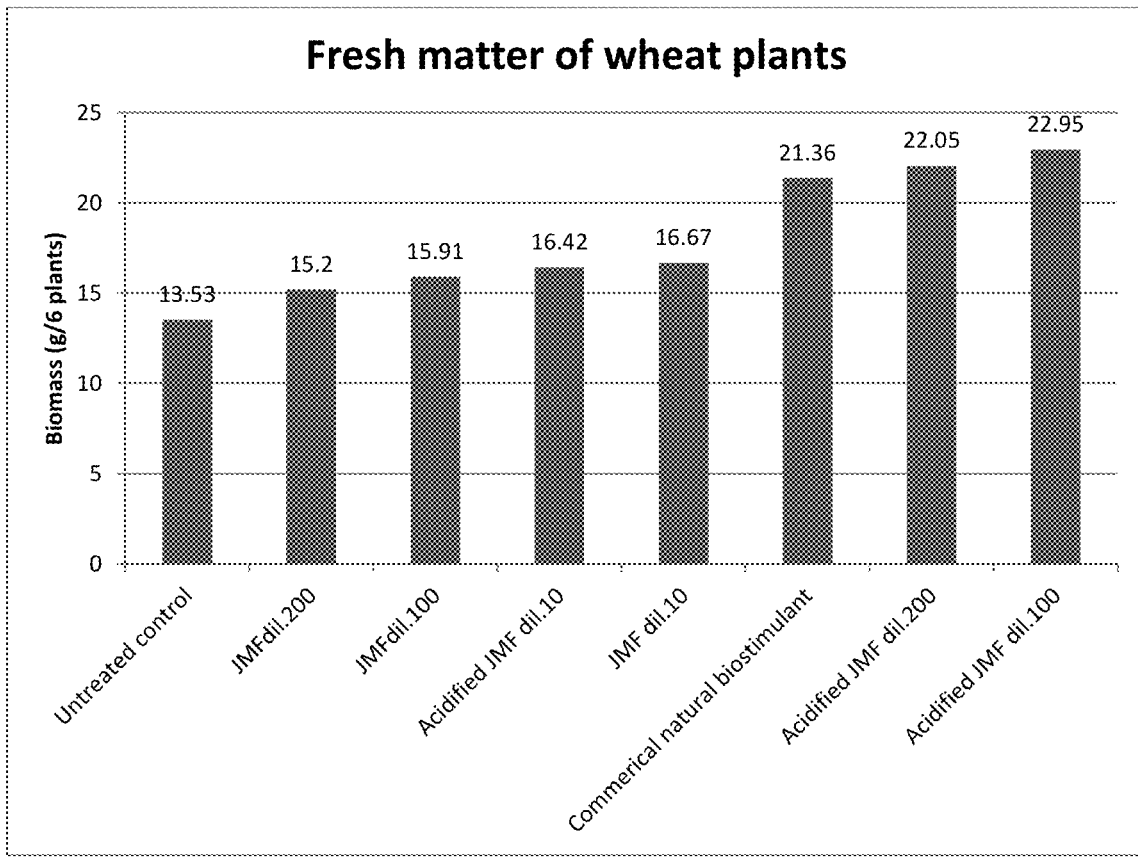

The present invention relates to compositions and methods for stimulating plant growth and/or for stimulating natural defenses of plants. In particular, the invention relates to a new juice of malt sprouts or malt sprouts-extracted juice as bio-stimulant or for preparing a biostimulant agent, for stimulating or promoting plant growth.

Plant growth stimulators are used in many crops to increase biomass, manage the rate of growth and to increase yield and quality. These products are also used to manage abiotic stresses such as cold stress, drought stress, and the like.

BACKGROUND OF THE INVENTION

Increase in yields is a central preoccupation of farmers. Now, yield largely depends on good development of the plant and consequently on its growth, as well as its good health.

Plant growth is directly linked to the absorption and assimilation of nutrients and minerals as well as the flows of hormones governing the elongation and differentiation of plant, tissues. Fertilizers and other molecules, such as carbohydrates, extracted from plants or algae, are used in order to increase plant growth.

But there is still a need for an environment-friendly source of nutrients that is safe for the plants for which it is intended, and that promotes plant growth.

DE4424574 relates to the use of a mixture of malt germs and dusts in the production of a fertilizer in pelletized or granulated form. But it does not anticipate the specific juices of malt sprouts according to the invention as biostimulants.

DE1104536 relates to the use of malt germs, for the preparation of solid or liquid gardening and flowering fertilizers. But it does not disclose the preparation and use of malt sprouts fraction extracts.

So far, co-products of the malting industry are mostly valued in Feed industry. Indeed, the study "Enquête sur les gisements et la valorisation des co-produits issus de l'Agro-Industrie "', Ademe-Reseda, 2008, states that from 1,656 MT of barley transformed in France in 2007, the malting process produced 1,325 MT of malt and generated 77 000 T of co-products among which 56 000 T of malt sprouts and 21,000 T of orgettes.

DETAILED DESCRIPTION OF THE INVENTION

One of the aims of the invention is to provide malt sprouts fraction extracts with interesting biostimulant properties.

One of the aims of the invention is to provide a process enabling to obtain malt sprouts fraction extracts with interesting biostimulant properties.

One of the aims of the invention is to provide the use of a specific starting material enabling to obtain malt sprouts fraction extracts with interesting biostimulant properties.

One of the aims of the invention is to provide a new use of co-products of the malting industry, with a better valorization as high value-added products.

The first object of the invention is a malt sprouts fraction extract wherein the malt sprouts fraction extract comprises at least 0.5%, and less than 5% of dry matter by total weight of the malt sprouts fraction extract and characterized at least by:

Total Nitrogen content from 25 to 60 g/kg of dry matter
Free Amino Nitrogen content from 3 to 10 g/kg of dry matter
Nucleic acid derivatives content from 2 to 5 g/kg of dry matter
Total free auxin content between 500 and 8000 ng/g of dry matter
Total gibberellin content between 0.1 and 3.2 ng/mg of dry matter
Total cytokinins content between 10 and 400 ng/g of dry matter.

Figure 4:
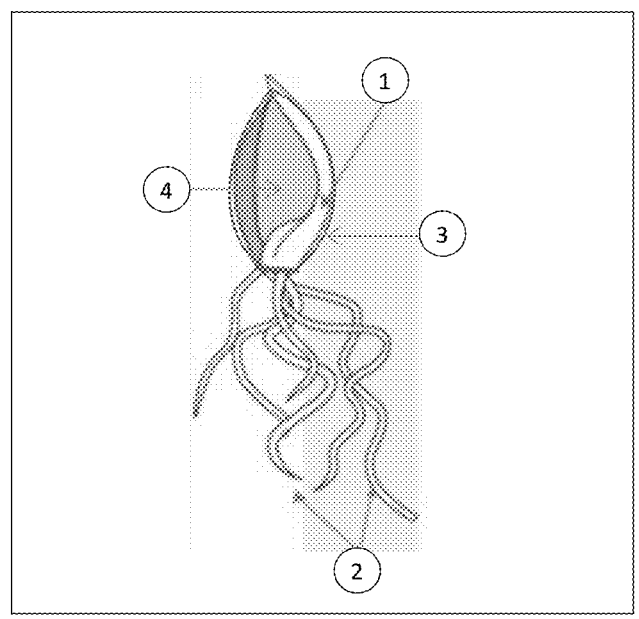

In the sense of the invention, the term "malt sprouts" includes the rootlets, the acrospires, the husks, the dust and mixtures thereof and corresponds to the co-products generated during the malting process. Malt sprouts are represented in FIG. 4 showing the rootlets, the acrospire and the husk.

In the sense of the invention, the term "malt sprouts fraction" refers to a specific and selected fraction of malt sprouts obtained by sieving (from 0.5 to 2.4 mm of width, preferably from 0.5 to 2 mm) or by air blowing or combination of both. These fractions, used as a starting material, offer a better performance in the processes and have a higher protein content as well as a better processing ability than malt sprouts.

In the sense of the present invention, the terms "malt sprouts fraction", "isolated malt sprouts fraction" and "malt fraction" are equivalent and can be used interchangeably.

The term "malt sprouts fraction extracts" according to the invention encompasses the products, containing water soluble components from malt sprouts or malt sprouts fractions, these components being initially present in these matters and obtained by diffusion as hereafter detailed.

Malt sprouts fraction extracts encompass the diluted malt sprouts fraction extracts as juice, also named "malt sprouts juice" or "juice of malt sprouts".

The malt sprouts fraction extract according to the invention comprises natural compounds synthesized by the cereal itself, during germination. These compounds therefore have much more chance of being well tolerated and of having nontoxic effects. These natural compounds, which are mainly nitrogen, Free Amino Nitrogen, Nucleic acid derivatives and phytohormons, can finally be used in biological agriculture.

In the sense of the present invention, the terms "malt sprouts fraction extracts", "malt fraction extracts" and "malt extracts" are equivalent and can be used interchangeably.

The presence of rootlets in the malt sprouts fraction extract of the present invention confers a specific technical effect. As defined in the present application, rootlets are "fractions of plant cells in a growth phase characterized by high nutritional value ingredients, especially nitrogen compounds including free amino nitrogen compounds and nucleic derivatives"

This composition leads to a higher efficiency as biostimulant for the extract of malt sprouts fraction containing rootlets.

The specific composition of rootlets extracts in nucleic acid derivatives and vegetal hormones allows to enhance the photosynthetic activity of wheat seedlings as describes in example 2. This leads to a high chlorophyll production and a heavier seedling biomass.

As an indicative composition of malt sprouts fractions, in particular barley malt sprouts fractions, used as initial raw material for the extraction process according to the invention, it may advantageously contain:
- 92 and 98% of Dry matter (d.m)
- 25-37% d.m. of Crude protein
- 43-52% d.m. total fibers from which 40-50% insoluble fibers (cellulose, hemicellulose, lignin) and 2-5% of soluble fibers;
- 7-12% d.m. total carbohydrates from which 4-7% starch and 4-6% sugars
- <1% d.m fats
- 5-7% d.m ash.

The term "Total Nitrogen content" is the sum of nitrogen bound in organic substances, nitrogen in the form of ammonia ($NH_3$-N) and ammonium ($NH_4^+$-N). The total nitrogen content according to the invention is determined by a quantitative method, the Kjeldahl method (Zeitschrift für Analytische Chemie, Herausgeber Dr. C. Remigius Fresenius. 22. armée, éditions C. W. Kreidels Verlag 1883. p. 366-382, J. Kjeldahl).

The term "Free Amino Nitrogen (FAN)" content is defined as the sum of the individual amino acids, ammonium ions, and small peptides (di- and tripeptides) in wort or liquid phase. FAN is determined by the EBC (European Brewery Convention) method 4.10.

The term "Nucleic acid derivatives (DAN) refers to intermediate and final products coming from the hydrolysis process of nucleic acids (DNA: DeoxyriboNucleic Acid, and RNA=RiboNucleic Acid). DAN is measured by the method described in the following article: *An Ion-Pairing High-Performance Liquid Chromatographic Method for the Direct Simultaneous Determination of Nucleotides, Deoxynucleotides, Nicotinic Coenzymes, Oxypurines, Nucleosides, and Bases in Perchloric Acid Cell Extracts* (Donato Di Pierro2, Barbara Tavazzi, Carlo Federico Perno, Marco Bartolini, Emanuela Balestra, Raffaele Calió, Bruno Giardina,* and Giuseppe Lazzarino)—Department of Experimental Medicine and Biochemical Sciences, University of Rome "Tor Vergata," Via Tor Vergata 135,00133 Rome, Italy; *Institute of Chemistry and Clinical Chemistry and "Centro CNR per la Chimica dei Recettori,"Catholic University of Rome "Sacro Cuore," Rome, Italy; and †Institute of Biochemical and Pharmacological Sciences, University of Catania, Catania, Italy-1995).

DAN are constituted of a complex mixture of:
Nucleotides, which form the basic structural unit of nucleic acids, composed of:
- a phosphate group,
- a purine nitrogenous base (adenine, guanine) or a pyrimidine nitrogenous base and cytosine, thymine, uracil),
- and a pentose sugar (a ribose for RNA and a deoxyribose for DNA).

Nucleosides, which consist simply of a nitrogenous base linked to a pentose sugar (either ribose or deoxyribose) by a glycosidic bond. According to the invention nucleosides include cytidine, uridine, adenosine, guanosine, thymidine and inosine.

| Base | Ribonucleoside | Deoxyribonucleoside |
|---|---|---|
| Adenine | Adenosine | Deoxyadenosine |
| Guanine | Guanosine | Deoxyguanosine |
| Uracil | Uridine | Deoxyuridine |
| Cytosine | Cytidine | Deoxycytidine |
| Thymine | 5-methyluridine | Thymidine |

Nitrogenous bases are organic molecules with a nitrogen atom that has the chemical properties of a base. The main biological function of a nitrogenous base is to bond nucleic acids together. According to the invention nitrogeneous bases include adenine, guanine, cytosine, thymine, uracil and hypoxanthine. Hypoxanthine is a naturally occurring purine derivative. It is occasionally found as a constituent of nucleic acids.

Nitrogenous bases are typically classified as the derivatives of two parent compounds, pyrimidine and purine. Purine nitrogenous bases are adenine and guanine and pyrimidine nitrogenous bases are cytosine, thymine, and uracil.

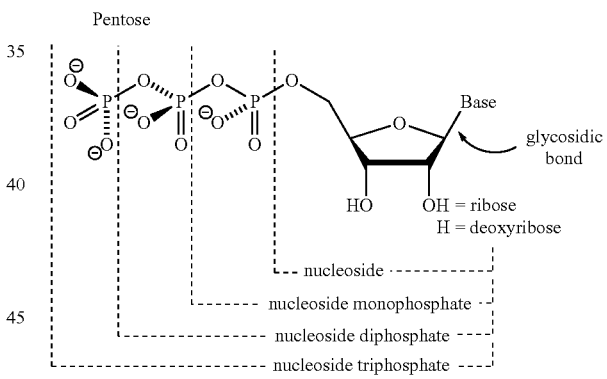

Purines

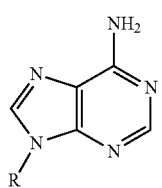
Adenine

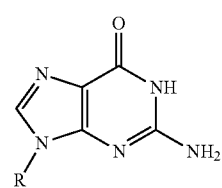
Guanine

| Base | Ribonucleoside-5'-monophosphate | Deoxyribonucleoside-5'-monophosphate |
|---|---|---|
| Adenine | Adenosine-5'-monophosphate = AMP | Deoxyadenosine-5'-monophosphate = dAMP |
| Guanine | Guanosine-5'-monophosphate = GMP | Deoxyguanosine-5'-monophosphate = dGMP |
| Uracil | Uridine-5'-monophosphate = UMP | Deoxyuridine-5'-monophosphate = dUMP |
| Cytosine | Cytidine-5'-monophosphate = CMP | Deoxycytidine-5'-monophosphate = dCMP |
| Thymine | Thymidine-5'-monophosphate (rare) | Deoxythymidine-5'-monophosphate = dTMP |

Pyrimidines

-continued

Cytosine   Uracil   Thymine

Auxins, cytokinins, abscisic, jasmonic and salicylic acids, gibberellins are simple molecules classified as the main phytohormons. According to the invention, phytohormons, also called vegetal hormons, are substances produced within the plant that regulates plant growth at extremely low concentration. They regulate cellular processes in targeted cells. The different molecules in each class are present in an active and non-denaturated state, in malt sprouts fractions and in the respective extracts at very low concentrations. Specialized analytical methods and analytical tools are required to detect and to quantify the concentrations. These methods are used and described in the following publications:

*The pea TCP transcription factor PsBRC1 acts downstream of Strigolactones to control shoot branching.* Plant Physiol. 2012 January; 158(1):225-38. Braun N, de Saint Germain A, Pillot J P, Boutet-Mercey S, Dalmais M, Antoniadi I, Li X, Maia-Grondard A, Le Signor C, Bouteiller N, Luo D, Bendahmane A, Turnbull C, Rameau C.

Nitrogen metabolism responses to water deficit act through both abscisic acid (ABA)-dependent and independent pathways in *Medicago truncatula* during post-germination. J Exp Bot. 2011 January; 62(2):605-15. Planchet E, Rannou O, Ricoult C, Boutet-Mercey S, Maia-Grondard A, Limami A M.

The five major plant growth regulating hormones are: auxins, gibberellins, cytokinins, ethylene, and abscisic acid. Auxins affect root growth, flower formation and fruit set. Gibberellins help break seed dormancy, and speed germination. Cytokinins stimulate cell division and also delay aging.

In the sense of the present invention, the terms "phytohormons", "vegetal hormons" and "plant hormons" are equivalent and can be used interchangeably.

The inventors have developed new malt sprouts fraction extracts comprising fractions of plant cells in a growth phase (rootlets and acrospires), dried during the malting process, and which are characterized by high nutritional value ingredients, especially nitrogen compounds including free amino nitrogen compounds and nucleic acid derivatives. These compounds are of particular interest for heterotrophic growth during germination and may have applications in plant growth and plant natural defense. The inventors have now demonstrated that the use of these new malt sprouts fraction extracts as juice (juice of malt sprouts) is a biostimulant, which is not considered in the prior art relating to malt sprouts fraction extracts.

In a particular embodiment, malt sprouts fraction extract wherein the malt sprouts fraction extract comprises at least 0.5%, and less than 1.1% of dry matter by total weight of the malt sprouts fraction extract is characterized at least by:
  Total Nitrogen content from 25 to 60 g/kg of dry matter
  Free Amino Nitrogen content from 3 to 10 g/kg of dry matter
  Nucleic acid derivatives content from 2 to 5 g/kg of dry matter
  Total free auxin content between 500 and 8000 ng/g of dry matter
  Total gibberellin content between 0.1 and 3.2 ng/mg of dry matter
  Total cytokinins content between 10 and 400 ng/g of dry matter.

In a particular embodiment, malt sprouts fraction extract wherein the malt sprouts fraction extract comprises at least 0.5%, and less than 3.5% of dry matter by total weight of the malt sprouts fraction extract is characterized at least by:
  Total Nitrogen content from 25 to 60 g/kg of dry matter
  Free Amino Nitrogen content from 3 to 10 g/kg of dry matter
  Nucleic acid derivatives content from 2 to 5 g/kg of dry matter
  Total free auxin content between 500 and 8000 ng/g of dry matter
  Total gibberellin content between 0.1 and 3.2 ng/mg of dry matter
  Total cytokinins content between 10 and 400 ng/g of dry matter.

In a particular embodiment, malt sprouts fraction extract wherein the malt sprouts fraction extract comprises at least 1.1%, and less than 3.5% of dry matter by total weight of the malt sprouts fraction extract is characterized at least by:
  Total Nitrogen content from 25 to 60 g/kg of dry matter
  Free Amino Nitrogen content from 3 to 10 g/kg of dry matter
  Nucleic acid derivatives content from 2 to 5 g/kg of dry matter
  Total free auxin content between 500 and 8000 ng/g of dry matter
  Total gibberellin content between 0.1 and 3.2 ng/mg of dry matter
  Total cytokinins content between 10 and 400 ng/g of dry matter.

In a particular embodiment, malt sprouts fraction extract wherein the malt sprouts fraction extract comprises at least 1.1%, and less than 5% of dry matter by total weight of the malt sprouts fraction extract is characterized at least by:
  Total Nitrogen content from 25 to 60 g/kg of dry matter
  Free Amino Nitrogen content from 3 to 10 g/kg of dry matter
  Nucleic acid derivatives content from 2 to 5 g/kg of dry matter
  Total free auxin content between 500 and 8000 ng/g of dry matter
  Total gibberellin content between 0.1 and 3.2 ng/mg of dry matter
  Total cytokinins content between 10 and 400 ng/g of dry matter.

In a particular embodiment, malt sprouts fraction extract wherein the malt sprouts fraction extract comprises at least 3.5%, and less than 5% of dry matter by total weight of the malt sprouts fraction extract is characterized at least by:
  Total Nitrogen content from 25 to 60 g/kg of dry matter
  Free Amino Nitrogen content from 3 to 10 g/kg of dry matter
  Nucleic acid derivatives content from 2 to 5 g/kg of dry matter
  Total free auxin content between 500 and 8000 ng/g of dry matter
  Total gibberellin content between 0.1 and 3.2 ng/mg of dry matter Total cytokinins content between 10 and 400 ng/g of dry matter.

In a particular embodiment, in malt sprouts fraction extract according to the invention, the malt is selected from barley, wheat, rye, spelt, corn, millet sorghum, oat, triticale, rice and mixtures thereof, preferably barley.

In a particular embodiment, malt sprouts fraction extract according to the invention are obtained from an aqueous extraction of malt sprouts fractions obtained by a sieving process and comprise a content of rootlets and acrospires higher than 50%, preferably higher than 60%, more preferably higher than 65% and even more preferably between 65% and 85% by total weight of fractions.

According to the invention, rootlets and acrospires are represented in FIG. 4.

According to the invention, the term "sieving process" refers to techniques used to separate particles from a mixture based on the difference in size of particles. It uses sieve plates for separation of coarse particles from finer particles.

In a particular embodiment, malt sprouts fraction extract according to the invention, wherein the malt is selected from barley, wheat, rye, spelt, corn, millet sorghum, oat, triticale, rice and mixtures thereof, preferably barley, are obtained from an aqueous extraction of malt sprouts fractions obtained by a sieving process and comprising a content of rootlets and acrospires higher than 50%, preferably higher than 60%, more preferably higher than 65% and even more preferably between 65% and 85% by total weight of fractions.

In a particular embodiment, malt sprouts fraction extract according to the invention, are obtained from an aqueous extraction of malt sprouts fractions characterized at least by:
Dry matter by total weight of the malt sprouts from 92% to 98%,
Crude protein content from 25 to 37 g/100 g of dry matter,
Free Amino Nitrogen content from 100 to 600 mg/100 g of malt sprouts, particularly 100, 200, 300, 400, 500, 600 mg/100 g of malt sprouts.

In a particular embodiment, malt sprouts fraction extract according to the invention, are obtained from an aqueous extraction of malt sprouts fractions characterized at least by:
Dry matter by total weight of the malt sprouts from 92% to 98%,
Crude protein content from 25 to 37 g/100 g of dry matter,
Free Amino Nitrogen content from 100 to 600 mg/100 g of malt sprouts, and preferably containing:
Total fibers content from 43 to 52 g/100 g of dry matter,
Total carbohydrates content from 7 to 12 g/100 g of dry matter,
Total sugars content from 4 to 6 g/100 g of dry matter,
Fats content below 1 g/100 g
Ash content from 5 to 7 g/100 g.

In a particular embodiment, malt sprouts fraction extract according to the invention, are obtained from an aqueous extraction of malt sprouts fractions characterized at least by:
Dry matter by total weight of the malt sprouts from 92% to 98%,
Crude protein content from 25 to 37 g/100 g of dry matter,
Free Amino Nitrogen content from 100 to 600 mg/100 g of malt sprouts, particularly 100, 200, 300, 400, 500, 600 mg/100 g of malt sprouts
Total fibers content from 43 to 52 g/100 g of dry matter,
Total sugars content from 4 to 6 g/100 g of dry matter,
Fats content below 1 g/100 g
Ash content from 5 to 7 g/100 g.

Another object of the invention is a process of preparation of malt sprouts fraction extract according to the invention, comprising the following steps:
a. Diffusion of diluted malt sprouts fractions in aqueous phase, in particular for 1 hour at a temperature from 20° C. to 60° C. and preferably in the presence of an acid, in particular sulfuric acid, to obtain two phases, an aqueous one and a solid one;
b. Optionally, separation of the aqueous phase from the solid phase to obtain a juice of malt sprouts.
c. Optionally, addition of preservatives.

According to the invention, a preservative is a chemical substance used to preserve foods or other organic materials from decomposition or fermentation.

In the process of preparation of malt sprouts fraction extract, the diffusion step is carried out at a temperature from 20° C. to 60° C. Above 60° C., a denaturation of phytohormons and proteins is observed, whereas below 20° C., the extraction of these molecules is much slower.

In a particular embodiment, the process of preparation of malt sprouts fraction extract according to the invention, comprises the following steps:
a. Diffusion of diluted malt sprouts fractions in water between 1 and 5 h, and more particularly between 1 and 2 h at a temperature from 20° C. to 60° C., to obtain two phases, an aqueous one and a solid one;
b. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;
c. Optionally, addition of preservatives.

In a particular embodiment, the process of preparation of malt sprouts fraction extract according to the invention, comprises the following steps:
a. Diffusion of diluted malt sprouts fractions in acidified water between 1 and 5 h, and more particularly between 1 and 2 h, advantageously at a temperature from 20° C. to 60° C.,
b. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
c. Optionally, addition of preservatives.

In a particular embodiment, the process of preparation of malt sprouts fraction extract according to the invention and comprising at least 0.5%, and less than 1.1% of dry matter by total weight of the malt sprouts fraction extract, comprise the following steps:
a. Diffusion of diluted malt sprouts fractions in water between 1 and 5 h, and more particularly between 1 and 2 h at a temperature from 20° C. to 60° C., to obtain two phases, an aqueous one and a solid one;
b. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;
c. Optionally, addition of preservatives.

In a particular embodiment, the process of preparation of malt sprouts fraction extract according to the invention and comprising at least 0.5%, and less than 3.5% of dry matter by total weight of the malt sprouts fraction extract, comprise the following steps:
a. Diffusion of diluted malt sprouts fractions in water between 1 and 5 h, and more particularly between 1 and 2 h at a temperature from 20° C. to 60° C., to obtain two phases, an aqueous one and a solid one;
b. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;
c. Optionally, addition of preservatives.

In a particular embodiment, the process of preparation of malt sprouts fraction extract according to the invention and comprising at least 1.1%, and less than 3.5% of dry matter by total weight of the malt sprouts fraction extract, comprise the following steps:
a. Diffusion of diluted malt sprouts fractions in water between 1 and 5 h, and more particularly between 1 and 2 h at a temperature from 20° C. to 60° C., to obtain two phases, an aqueous one and a solid one;
b. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;
c. Optionally, addition of preservatives.

In a particular embodiment, the process of preparation of malt sprouts fraction extract according to the invention and comprising at least 1.1%, and less than 5% of dry matter by total weight of the malt sprouts fraction extract, comprise the following steps:
a. Diffusion of diluted malt sprouts fractions in water between 1 and 5 h, and more particularly between 1 and 2 h at a temperature from 20° C. to 60° C., to obtain two phases, an aqueous one and a solid one;
b. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;
c. Optionally, addition of preservatives.

In a particular embodiment, the process of preparation of malt sprouts fraction extract according to the invention and comprising at least 3.5%, and less than 5% of dry matter by total weight of the malt sprouts fraction extract, comprise the following steps:
a. Diffusion of diluted malt sprouts fractions in water between 1 and 5 h, and more particularly between 1 and 2 h at a temperature from 20° C. to 60° C., to obtain two phases, an aqueous one and a solid one;
b. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;
c. Optionally, addition of preservatives.

In a particular embodiment, the process of preparation of malt sprouts fraction extract according to the invention and comprising at least 0.5%, and less than 1.1% of dry matter by total weight of the malt sprouts fraction extract, comprise the following steps:
a. Diffusion of diluted malt sprouts fractions in acidified water between 1 and 5 h, and more particularly between 1 and 2 h, advantageously at a temperature from 20° C. to 60° C.,
b. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
c. Optionally, addition of preservatives.

In a particular embodiment, the process of preparation of malt sprouts fraction extract according to the invention and comprising at least 0.5%, and less than 3.5% of dry matter by total weight of the malt sprouts fraction extract, comprise the following steps:
a. Diffusion of diluted malt sprouts fractions in acidified water between 1 and 5 h, and more particularly between 1 and 2 h, advantageously at a temperature from 20° C. to 60° C.,
b. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
c. Optionally, addition of preservatives.

In a particular embodiment, the process of preparation of malt sprouts fraction extract according to the invention and comprising at least 1.1%, and less than 3.5% of dry matter by total weight of the malt sprouts fraction extract, comprise the following steps:
a. Diffusion of diluted malt sprouts fractions in acidified water between 1 and 5 h, and more particularly between 1 and 2 h, advantageously at a temperature from 20° C. to 60° C.,
b. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
c. Optionally, addition of preservatives.

In a particular embodiment, the process of preparation of malt sprouts fraction extract according to the invention and comprising at least 1.1%, and less than 5% of dry matter by total weight of the malt sprouts fraction extract, comprise the following steps:
a. Diffusion of diluted malt sprouts fractions in acidified water between 1 and 5 h, and more particularly between 1 and 2 h, advantageously at a temperature from 20° C. to 60° C.,
b. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
c. Optionally, addition of preservatives.

In a particular embodiment, the process of preparation of malt sprouts fraction extract according to the invention and comprising at least 3.5%, and less than 5% of dry matter by total weight of the malt sprouts fraction extract, comprise the following steps:
a. Diffusion of diluted malt sprouts fractions in acidified water between 1 and 5 h, and more particularly between 1 and 2 h, advantageously at a temperature from 20° C. to 60° C.,
b. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
c. Optionally, addition of preservatives.

Another object of the invention is a process of preparation of malt sprouts fraction extract according to the invention comprising the following steps:
a. Dilution of isolated malt sprouts fractions in water, preferably with a ratio of 1/10 (malt sprouts/water) to obtain diluted malt sprouts fractions, b. Diffusion of these diluted malt sprouts fractions in aqueous phase, in particular for 1 hour at a temperature from 20° C. to 60° C. and preferably in the presence of an acid, in particular sulfuric acid, to obtain two phases, an aqueous one and a solid one;

c. Optionally, separation of the aqueous phase from the solid phase to obtain a juice of malt sprouts.

d. Optionally, addition of preservatives.

In a particular embodiment, the process of preparation of malt sprouts fraction extract according to the invention, comprise the following steps:

a. Dilution of isolated malt sprouts fractions in water, with a ratio malt sprouts fractions/aqueous solvent ranging from 1/15 to 1/4, preferably 1/10 to obtain diluted malt sprouts fractions, b. Diffusion of these diluted malt sprouts fractions in water between 1 and 5 h, and more particularly between 1 and 2 h at a temperature from 20° C. to 60° C., to obtain two phases, an aqueous one and a solid one;

c. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;

d. Optionally, addition of preservatives.

In a particular embodiment, the process of preparation of malt sprouts fraction extract according to the invention, comprise the following steps:

a. Dilution of isolated malt sprouts fractions in acidified water with a ratio malt sprouts fractions/water ranging from 1/15 to 1/4, preferably 1/10 with a final pH of the expected juice lower than 4, preferably lower than 2 to obtain diluted malt sprouts fractions, b. Diffusion of these diluted malt sprouts fractions in acidified water between 1 and 5 h, and more particularly between 1 and 2 h, advantageously at a temperature from 20° C. to 60° C., c. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts d. Optionally, addition of preservatives.

In a particular embodiment, the process of preparation of malt sprouts fraction extract according to the invention and comprising at least 0.5%, and less than 1.1% of dry matter by total weight of the malt sprouts fraction extract, comprise the following steps:

a. Dilution of isolated malt sprouts fractions in water, with a ratio malt sprouts fractions/aqueous solvent ranging from 1/15 to 1/4, preferably 1/10 to obtain diluted malt sprouts fractions, b. Diffusion of these diluted malt sprouts fractions in water between 1 and 5 h, and more particularly between 1 and 2 h at a temperature from 20° C. to 60° C., to obtain two phases, an aqueous one and a solid one;

c. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;

d. Optionally, addition of preservatives.

In a particular embodiment, the process of preparation of malt sprouts fraction extract according to the invention and comprising at least 0.5%, and less than 3.5% of dry matter by total weight of the malt sprouts fraction extract, comprise the following steps:

a. Dilution of isolated malt sprouts fractions in water, with a ratio malt sprouts fractions/aqueous solvent ranging from 1/15 to 1/4, preferably 1/10 to obtain diluted malt sprouts fractions, b. Diffusion of these diluted malt sprouts fractions in water between 1 and 5 h, and more particularly between 1 and 2 h at a temperature from 20° C. to 60° C., to obtain two phases, an aqueous one and a solid one;

c. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;

d. Optionally, addition of preservatives.

In a particular embodiment, the process of preparation of malt sprouts fraction extract according to the invention and comprising at least 1.1%, and less than 3.5% of dry matter by total weight of the malt sprouts fraction extract, comprise the following steps:

a. Dilution of isolated malt sprouts fractions in water, with a ratio malt sprouts fractions/aqueous solvent ranging from 1/15 to 1/4, preferably 1/10 to obtain diluted malt sprouts fractions, b. Diffusion of these diluted malt sprouts fractions in water between 1 and 5 h, and more particularly between 1 and 2 h at a temperature from 20° C. to 60° C., to obtain two phases, an aqueous one and a solid one;

c. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;

d. Optionally, addition of preservatives.

In a particular embodiment, the process of preparation of malt sprouts fraction extract according to the invention and comprising at least 1.1%, and less than 5% of dry matter by total weight of the malt sprouts fraction extract, comprise the following steps:

a. Dilution of isolated malt sprouts fractions in water, with a ratio malt sprouts fractions/aqueous solvent ranging from 1/15 to 1/4, preferably 1/10 to obtain diluted malt sprouts fractions, b. Diffusion of these diluted malt sprouts fractions in water between 1 and 5 h, and more particularly between 1 and 2 h at a temperature from 20° C. to 60° C., to obtain two phases, an aqueous one and a solid one;

c. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;

d. Optionally, addition of preservatives.

In a particular embodiment, the process of preparation of malt sprouts fraction extract according to the invention and comprising at least 3.5%, and less than 5% of dry matter by total weight of the malt sprouts fraction extract, comprise the following steps:

a. Dilution of isolated malt sprouts fractions in water, with a ratio malt sprouts fractions/aqueous solvent ranging from 1/15 to 1/4, preferably 1/10 to obtain diluted malt sprouts fractions, b. Diffusion of these diluted malt sprouts fractions in water between 1 and 5 h, and more particularly between 1 and 2 h at a temperature from 20° C. to 60° C., to obtain two phases, an aqueous one and a solid one;

c. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;
d. Optionally, addition of preservatives.

In a particular embodiment, the process of preparation of malt sprouts fraction extract according to the invention and comprising at least 0.5%, and less than 1.1% of dry matter by total weight of the malt sprouts fraction extract, comprise the following steps:
a. Dilution of isolated malt sprouts fractions in acidified water with a ratio malt sprouts fractions/water ranging from 1/15 to 1/4, preferably 1/10 with a final pH of the expected juice lower than 4, preferably lower than 2 to obtain diluted malt sprouts fractions,
b. Diffusion of these diluted malt sprouts fractions in acidified water between 1 and 5 h, and more particularly between 1 and 2 h, advantageously at a temperature from 20° C. to 60° C.,
c. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
d. Optionally, addition of preservatives.

In a particular embodiment, the process of preparation of malt sprouts fraction extract according to the invention and comprising at least 0.5%, and less than 3.5% of dry matter by total weight of the malt sprouts fraction extract, comprise the following steps:
a. Dilution of isolated malt sprouts fractions in acidified water with a ratio malt sprouts fractions/water ranging from 1/15 to 1/4, preferably 1/10 with a final pH of the expected juice lower than 4, preferably lower than 2 to obtain diluted malt sprouts fractions,
b. Diffusion of these diluted malt sprouts fractions in acidified water between 1 and 5 h, and more particularly between 1 and 2 h, advantageously at a temperature from 20° C. to 60° C.,
c. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
d. Optionally, addition of preservatives.

In a particular embodiment, the process of preparation of malt sprouts fraction extract according to the invention and comprising at least 1.1%, and less than 3.5% of dry matter by total weight of the malt sprouts fraction extract, comprise the following steps:
a. Dilution of isolated malt sprouts fractions in acidified water with a ratio malt sprouts fractions/water ranging from 1/15 to 1/4, preferably 1/10 with a final pH of the expected juice lower than 4, preferably lower than 2 to obtain diluted malt sprouts fractions,
b. Diffusion of these diluted malt sprouts fractions in acidified water between 1 and 5 h, and more particularly between 1 and 2 h, advantageously at a temperature from 20° C. to 60° C.,
c. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
d. Optionally, addition of preservatives.

In a particular embodiment, the process of preparation of malt sprouts fraction extract according to the invention and comprising at least 1.1%, and less than 5% of dry matter by total weight of the malt sprouts fraction extract, comprise the following steps:
a. Dilution of isolated malt sprouts fractions in acidified water with a ratio malt sprouts fractions/water ranging from 1/15 to 1/4, preferably 1/10 with a final pH of the expected juice lower than 4, preferably lower than 2 to obtain diluted malt sprouts fractions,
b. Diffusion of these diluted malt sprouts fractions in acidified water between 1 and 5 h, and more particularly between 1 and 2 h, advantageously at a temperature from 20° C. to 60° C.,
c. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
d. Optionally, addition of preservatives.

In a particular embodiment, the process of preparation of malt sprouts fraction extract according to the invention and comprising at least 3.5%, and less than 5% of dry matter by total weight of the malt sprouts fraction extract, comprise the following steps:
a. Dilution of isolated malt sprouts fractions in acidified water with a ratio malt sprouts fractions/water ranging from 1/15 to 1/4, preferably 1/10 with a final pH of the expected juice lower than 4, preferably lower than 2 to obtain diluted malt sprouts fractions,
b. Diffusion of these diluted malt sprouts fractions in acidified water between 1 and 5 h, and more particularly between 1 and 2 h, advantageously at a temperature from 20° C. to 60° C.,
c. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts
d. Optionally, addition of preservatives.

Another object of the invention is a malt sprouts fraction extract according to the invention wherein the extract is such as obtained by a method of preparation comprising the following steps:
a. Dilution of isolated malt sprouts fractions in water, preferably with a ratio of 1/10 (malt sprouts/water) to obtain diluted malt sprouts fractions,
b. Diffusion of these diluted malt sprouts fractions in aqueous phase, in particular for 1 hour at a temperature from 20° C. to 60° C. and preferably in the presence of an acid, in particular sulfuric acid, to obtain two phases, an aqueous one and a solid one;
c. Optionally, separation of the aqueous phase from the solid phase to obtain a juice of malt sprouts.
d. Optionally, addition of preservatives.

A particular object of the invention is a malt sprouts fraction extract according to the invention wherein the extract is such as obtained by a method of preparation comprising the following steps:
a. Dilution of isolated malt sprouts fractions in water, with a ratio malt sprouts fractions/aqueous solvent ranging from 1/15 to 1/4, preferably 1/10 to obtain diluted malt sprouts fractions,
b. Diffusion of these diluted malt sprouts fractions in water between 1 and 5 h, and more particularly between 1 and 2 h at a temperature from 20° C. to 60° C., to obtain two phases, an aqueous one and a solid one;
c. Optionally, separation of the aqueous phase from the solid phase in order to get rid of the insoluble coarse compounds by using a centrifuge and/or a filter plate and/or a filter press and/or a press and/or a filter-candle, and to obtain a juice of malt sprouts;

d. Optionally, addition of preservatives.

A particular object of the invention is a malt sprouts fraction extract according to the invention wherein the extract is such as obtained by a method of preparation comprising the following steps:

a. Dilution of isolated malt sprouts fractions in acidified water with a ratio malt sprouts fractions/water ranging from 1/15 to 1/4, preferably 1/10 with a final pH of the expected juice lower than 4, preferably lower than 2 to obtain diluted malt sprouts fractions, b. Diffusion of these diluted malt sprouts fractions in acidified water between 1 and 5 h, and more particularly between 1 and 2 h, advantageously at a temperature from 20° C. to 60° C., c. Optionally, separation of the aqueous phase from the solid phase in order to get rid of the insoluble coarse compounds by using a centrifuge and/or a filter plate and/or a filter press and/or a press and/or a filter-candle, to obtain a juice of malt sprouts d. Optionally, addition of preservatives.

Thus it is to be pointed out that the malt sprouts fraction extracts of the invention can be obtained from the above described starting material i.e malt sprouts, by a physical separation in said malt sprouts leading to malt sprouts fractions which are then submitted to one of the above defined chemical processes.

The determination of the combination of these two physical and chemical processes is a non-straightforward way. However, once the link between the choice of the malt sprouts fractions and the contents of the malt sprouts fraction extracts is made, which is one of the aspects of the invention, the implementation of one of the described processes enables to obtain said malt sprouts fraction extracts.

Furthermore, and last but not least, the malt sprouts fraction extracts have been found to have interesting bio stimulating properties.

Another object of the invention is the use of a juice of malt sprouts according to the invention, comprising water and malt sprouts fraction extracts comprising rootlets and acrospires in a ratio malt sprout fractions/water ranging from 1/4 to 1/15, preferably from 1/8 to 1/10 as a biostimulant agent or for preparing a biostimulant agent.

According to the invention, the term 'biostimulant' is also named biofertilizer, soil activator, stimulator of growth and/or development, or phytostimulant and answers the following definition:

"Plant biostimulants contain substance(s) and/or microorganisms whose function when applied to plants or the rhizosphere is to stimulate natural processes to enhance/benefit nutrient uptake, nutrient efficiency, tolerance to abiotic stress, and crop quality. Biostimulants have no direct action against pests, and therefore do not fall within the regulatory framework of pesticides." (EBIC 2014: http.//www.biostimulants.eu/: The European Biostimulant Industry Council (EBIC) promotes the contribution of plant biostimulants to make agriculture more sustainable and resilient and in doing so promotes the growth and development of the European Biostimulant Industry. EBIC was founded in June 2011 as the European Biostimulant Industry Consortium and changed its named when it gained legal identity in 2013).

In the sense of the present invention, the terms "biostimulant" and "biostimulant agent" are equivalent and can be used interchangeably.

A particular object of the invention is the use of a juice of malt sprouts according to the invention, wherein the malt sprouts fraction extracts comprise at least 0.5%, and less than 5% of dry matter by total weight of the malt sprouts fraction extract and characterized at least by:

Total Nitrogen content from 25 to 60 g/kg of dry matter

Free Amino Nitrogen content from 3 to 10 g/kg of dry matter

Nucleic acid derivatives content from 2 to 5 g/kg of dry matter

Total free auxin content between 500 and 8000 ng/g of dry matter

Total gibberellin content between 0.1 and 3.2 ng/mg of dry matter

Total cytokinins content between 10 and 400 ng/g of dry matter.

A particular object of the invention is the use of a juice of malt sprouts according to the invention, wherein the malt sprouts fraction extracts are obtained by a method of preparation comprising the following steps:

a. Isolation of malt sprouts fractions, b. Dilution of theses fractions in water, preferably with a ratio of 1/10 (malt sprouts/water), c. Diffusion in aqueous phase, in particular for 1 hour at a temperature from 20° C. to 60° C. and preferably in the presence of an acid, in particular sulfuric acid;

d. Separation of the aqueous phase from the solid phase, and e. Optionally, addition of preservatives, in particular sorbate and benzoate.

A particular object of the invention is the use of a juice of malt sprouts according to the invention, wherein the malt sprouts fraction extracts are obtained by a method of preparation comprising the following steps:

a. Isolation of malt sprouts fractions, b. Dilution of theses fractions in water, with a ratio malt sprouts fractions/aqueous solvent ranging from 1/15 to 1/7, preferably 1/10, c. Diffusion in water between 1 and 5 h, and more particularly between 1 and 2 h at a temperature from 20° C. to 60° C.

d. Separation of the aqueous phase from the solid phase in order to get rid of the insoluble coarse compounds by using a centrifuge and/or a filter plate and/or a filter press and/or a press and/or a filter-candle, e. Optionally, addition of preservatives, in particular sorbate and benzoate.

A particular object of the invention is the use of a juice of malt sprouts according to the invention, wherein the malt sprouts fraction extracts are obtained by a method of preparation comprising the following steps:

a. Isolation of malt sprouts fractions, b. Dilution of theses fractions in acidified water with a ratio malt sprouts fractions/water ranging from 1/15 to 1/7, preferably 1/10 with a final pH of the expected juice lower than 4, preferably lower than 2, c. Diffusion in acidified water between 1 and 5 h, and more particularly between 1 and 2 h, advantageously at a temperature from 20° C. to 60° C., d. Separation of the aqueous phase from the solid phase in order to get rid of the insoluble coarse compounds by using a centrifuge and/or a filter plate and/or a filter press and/or a press and/or a filter-candle, e. Optionally, addition of preservatives, in particular sorbate and benzoate.

A particular object of the invention is the use of a juice of malt sprouts according to the invention, wherein the malt sprouts fraction extracts are obtained by a method of preparation comprising the following steps:
  a. Isolation of malt sprouts fractions,
  b. Dilution of theses fractions in water, preferably with a ratio of 1/10 (malt sprouts/water),
  c. Diffusion in aqueous phase, in particular for 1 hour at a temperature from 20° C. to 60° C. and preferably in the presence of an acid, in particular sulfuric acid;
  d. Separation of the aqueous phase from the solid phase, and
  e. Optionally, addition of preservatives, in particular sorbate and benzoate.

or obtained by a method of preparation comprising the following steps:
  a. Isolation of malt sprouts fractions,
  b. Dilution of theses fractions in water, with a ratio malt sprouts fractions/aqueous solvent ranging from 1/15 to 1/7, preferably 1/10,
  c. Diffusion in water between 1 and 5 h, and more particularly between 1 and 2 h at a temperature from 20° C. to 60° C.
  d. Separation of the aqueous phase from the solid phase in order to get rid of the insoluble coarse compounds by using a centrifuge and/or a filter plate and/or a filter press and/or a press and/or a filter-candle,
  e. Optionally, addition of preservatives, in particular sorbate and benzoate.

or obtained by a method of preparation comprising the following steps:
  a. Isolation of malt sprouts fractions,
  b. Dilution of theses fractions in acidified water with a ratio malt sprouts fractions/water ranging from 1/15 to 1/7, preferably 1/10 with a final pH of the expected juice lower than 4, preferably lower than 2,
  c. Diffusion in acidified water between 1 and 5 h, and more particularly between 1 and 2 h, advantageously at a temperature from 20° C. to 60° C.,
  d. Separation of the aqueous phase from the solid phase in order to get rid of the insoluble coarse compounds by using a centrifuge and/or a filter plate and/or a filter press and/or a press and/or a filter-candle,
  e. Optionally, addition of preservatives, in particular sorbate and benzoate.

A particular object of the invention is the use of a juice of malt sprouts according to the invention, wherein the juice of malt sprouts is further diluted in water with dilution ratios juice of malt sprouts/water ranging from 1/10 to 1/500, preferably 1/100 or 1/200.

In a particular embodiment, the juice of malt sprouts according to the invention is used in combination with an additional plant growth stimulant and/or an additional and/or natural plant defense stimulant.

It can be applied in the form of ready mixes. The juice of malt sprouts can also be formulated individually and mixed upon use, i.e. applied in the form of tank mixes. The juice of malt sprouts can be used as such or in the form of their formulations, and furthermore also as mixtures with plant growth stimulants, ready mixes or tank mixes. Compositions may also be mixed with other active compounds, such as herbicides, fungicides, insecticides, acaricides, nematicides, bird repellents, growth substances, plant nutrients and agents which improve soil structure.

A plant growth stimulant improves and regulates the growth of plants. Plant hormones and growth regulators are chemicals that affect all aspects of plant growth, including: germination, root growth, flowering, maturity and fruit set. Extremely small concentrations of these substances produce major growth changes.

According to the invention, a plant defense stimulant increases the plant tolerance to and recovery from abiotic stresses.

In a particular embodiment, the juice of malt sprouts according to the invention is used in methods for stimulating plant growth.

In a particular embodiment, the juice of malt sprouts according to the invention is used in methods for stimulating natural plant defenses.

In a particular embodiment, the juice of malt sprouts according to the invention is used in methods for treating seeds or plants.

A particular object of the invention is the use of a juice of malt sprouts according to the invention, wherein the juice of malt sprouts confers an improved nutrient absorption, confers an improved crop quality, improves resistance to biotic and/or abiotic stresses, improves nitrogen uptake by plants, enhances plant height, leaf area, biomass, plant vigor, or combination thereof.

According to the invention, the term "nutrient absorption" refers to the ability of the plant to incorporate nutrients in its growing cycle.

According to the invention, the term "biotic stress" refers to the stress that occurs as a result of damage done to an organism by other living organisms, such as bacteria, viruses, fungi, parasites, beneficial and harmful insects, weeds, and cultivated or native plants According to the invention, the term "abiotic stress" refers to environmental conditions that reduce growth and yield of plants below optimum levels. e.g., drought, extreme cold or heat, sun exposure, high wind—which can have adverse effects on an ecosystem.

A particular object of the invention is the use of a juice of malt sprouts according to the invention, in methods for stimulating plant growth or for stimulating natural plant defenses or for treating seeds or plants or wherein the juice of malt sprouts confers an improved nutrient absorption, confers an improved crop quality, improves resistance to biotic and/or abiotic stresses, improves nitrogen uptake by plants, enhances plant height, leaf area, biomass, plant vigor, or combination thereof.

Another object of the invention is a method for stimulating plant growth and/or for improving the natural plant defense, which comprises the application on said plants, in particular by spraying, of a composition comprising a malt sprouts fraction extract according to the invention, in an amount in a range from 1 gram to 1000 grams per hectare of dry matter contained in malt sprouts fraction extract.

A particular object of the invention is a method according to the invention, wherein the plant is chosen from the group consisted of commonly cultivated member of the kingdom Plantae.

A particular object of the invention is a method according to the invention, wherein the plant is chosen in the group comprising the Plant Subkingdom of Spermatophytes, and more particularly the Phylum of Angiosperms.

A particular object of the invention is a method according to the invention, wherein the plant is chosen in the group consisted of all families constituting the Phylum of Angiosperms.

In the sense of the invention, the families constituting the Phylum of Angiosperms are defined according to the following reference: "An update of the Angiosperm Phylogeny Group classification for the orders and families of flowering plants: APG IV" (Botanical Journal of the Linnean Society Volume 181, Issue 1, pages 1-20, May 2016).

A particular object of the invention is a method according to the invention, wherein the plant is chosen in the group consisted of the:

Dicots: Arabidopsis, cucumber, rapeseed, sunflower, soya, bean, alfalfa, tomato vine.

Monocots: Corn, wheat, barley, leek.

A particular object of the invention is a method according to the invention, wherein the plant is chosen from the group consisted of commonly cultivated member of the kingdom Plantae, or in the group comprising the Plant Subkingdom of Spermatophytes, and more particularly the Phylum of Angiosperms, or in group consisted of all families constituting the Phylum of Angiosperms, or in the group consisted of the:

Dicots: Arabidopsis, cucumber, rapeseed, sunflower, soya, bean, alfalfa, tomato vine Monocots: Corn, wheat, barley, leek.

A particular object of the invention is a method according to the invention, wherein the application on plants is carried out pre-emergence, post-emergence or both.

Malt sprouts fraction extracts according to the invention can be used, depending of the treated plant, either in pots in a laboratory or a greenhouse or in fields, and either by a foliar administration or on roots.

Other embodiments of the invention are hereafter disclosed. For the understanding of these embodiments, the following definitions of some expressions are indicated, which are in no way in contradiction with the previously mentioned definitions.

The term "turf" used herein refers to grass which grow in areas in which they are desired, or purposely planned for and maintained, for example, a lawn. Turf also refers to a sod, where the surface layer of ground consisting of a mat of grass and grass roots.

The term "juice of malt sprouts' is used in the following disclosure for designating the malt sprout extract as juice or malt sprouts-extracted juice, obtained from an aqueous extraction of malt sprouts fractions including rootlets, acrospires, husks and dust, as further disclosed. The term 'juice of malt sprouts', 'malt sprouts—extracted juice', 'malt sprout extract as juice' are equivalent.

In the sense of the invention, the term "malt sprouts fractions" includes the rootlets, the acrospires, the husks and the dust.

The term "rootlet" used generically by the profession actually refers to a mixture of different co-products generated during the malting, containing various proportions: malt dust, and sometimes barley dust, envelope fragments (husk or hull), fragments of broken grains, roots (rootlets) and acrospires or fragments thereof. The real roots and the acrospires from the germ (malt sprouts) are the first visible components of seedlings. The coarse mixture of these co-products is marketed as such or as granules (pellets) in animal feed under the "malt sprouts" which is somewhat excessive given the presence proportionally more or less other components.

The term "an amount of sufficient to stimulate or promote plant growth" means any amount of malt sprouts extract according to the invention capable of increasing plant growth, seedling germination, biomass, enhancing the chlorophyll content, and the like, relative to an untreated control. In general, the amount sufficient to stimulate plant growth may be within the application rate range of from about 1 to about 1000 grams of malt sprouts extract (dry matter d.m. or active ingredient, a.i.) per hectare (ha). Optimal application rates for enhancing/stimulating plant growth may depend on a given crop plant and the ideal application rate range may comprise grams malt sprouts extract per hectare, such as from about 10 to about 100 g a.i. or d.m./ha.

A first object of the invention the use of a juice of malt sprouts comprising water and malt sprouts fractions comprising rootlets and acrospires in a ratio of malt sprouts fractions/water ranging from 1/7 to 1/15, preferably from 1/8 to 1/10 as a biostimulant agent or for preparing a biostimulant agent.

This juice of malt sprouts is preferably further diluted before application, preferably in water with dilution ratios juice of malt sprouts/water ranging from 1/10 to 1/500, the dilutions 1/100 and 1/200 being preferred ones.

Another object of the invention is the use of a juice of malt sprouts according to the invention in combination with an additional plant growth stimulant or promoter and/or an additional and/or natural plant defense stimulant or promoter.

In particular, the juice of malt sprouts according to the invention is used in methods for stimulating or promoting plant growth, in methods for stimulating natural plant defenses, and/or in methods for treating seeds or plants.

Another object of the invention is a method for stimulating or promoting plant growth and/or for improving the natural plant defense, which comprises the application on said plants, in particular by spraying, of a composition comprising a juice of malt sprouts as defined in the invention in an amount sufficient to stimulate or promote plant growth and/or to improve the natural plant defense.

The application may be carried out pre-emergence, post-emergence or both.

The inventors demonstrated that the juice of malt sprouts according to the invention improves the functioning of the soil, the plant, or the interactions between soil and plant. It has an effect on the stimulation of biological processes. So the juice of malt sprouts has the capacity to activate the growth of plants that are treated. The use of this extract will advantageously make it possible to use smaller amounts of fertilizers, giving an increase in yields. In biological culture, the use of this extract will allow the partial or complete disappearance of chemical fertilizers.

DETAILED DESCRIPTION OF THE INVENTION

Juice of malt sprouts (malt sprouts—extracted juice)

As an indicative composition of barley malt sprouts, used as initial raw material for the extraction process according to the invention, it may advantageously contain:

90-96% of Dry matter (d.m.)

20-35% d.m. of Crude protein (Nx6,25)

43-57% d.m. total fibers from which 40-50% insoluble fibers (cellulose, hemicellulose, lignin) and 2-5% of soluble fibers;

7-17% d.m. total carbohydrates from which 4-7% starch and 7-7% sugars

<1% d.m. fats 5-7% d.m. ash.

A juice of malt sprouts according to the invention is characterized at least by 0.5 to 5% of dry matter (d.m) and a content of nitrogen compounds ranging from 2,5 to 5% d.m.

In a particular embodiment, a juice of malt sprouts according to the invention is characterized at least by:

(i) Nitrogen compounds including Free Amino Nitrogen in an amount of nitrogen higher than 2,5% by weight of dry matter, and
(ii) Nucleic acid derivatives such as purines and pyrimidines bases in an amount higher than 0.1% by weight of dry matter.

Such juice of malt sprouts as defined above may be obtained by a method of preparation comprising the following steps:
(i) Isolation of malt sprouts fractions enriched in anyone of rootlets, acrospires, hulk, dust and mixtures thereof,
(ii) Dilution of theses fractions in water, preferably with a ratio of 1:10 (malt sprouts: water),
(iii) Diffusion in aqueous phase, in particular for 1 hour at 20° C. and preferably in the presence of an acid, in particular sulfuric acid;
(iv) Separation of the aqueous phase from the solid phase, and
(v) Addition of preservatives, in particular sorbate and benzoate.

In a particular embodiment, malt sprouts of the invention is obtained from malted cereal selected from barley, wheat, rye, spelt, corn, millet sorghum, oat, triticale, rice and mixtures thereof, preferably barley.

In a preferred embodiment, the malt sprouts are barley malt sprouts.

As examples of barley varieties, mention may be made to the varieties selected from Sebastian, Azurel, Etincel and mixtures thereof.

Advantageously, the juice of malt sprouts of the invention is obtained from an aqueous extraction of malt sprouts fractions of barley comprising a content higher than 50%, preferably higher than 65%, more preferably comprised between 65% and 85% of rootlets and acrospires by total weight of malt sprouts fractions.

Such fractions may be obtained by sieving method using for example a vibratory sieve shaker Retsch AS200 and following 'sieves' assembled from the biggest to the smallest screen bottom-250-560-1000 µm.

In a particular embodiment, the method of preparation of a juice of malt sprouts as defined above may comprises the following steps:
(a) Isolation of malt sprouts fractions enriched in anyone of rootlets, acrospires, hulk, dust and mixtures thereof, at the end of the malt drying step;
(b) Dilution of theses fractions in water, with a ratio malt sprouts fractions/aqueous solvent ranging from 1/15 to 1/7, preferably 1/10,
(c) Diffusion in water between 1 and 5 h, and more particularly between 1 and 2 h at temperature 20° C.
(d) Separation (filtration) of the aqueous phase from the solid phase in order to get rid of the insoluble coarse compounds by using a centrifuge and/or a filter plate and/or a filter press and/or a press and/or a filter-candle,
(e) Optionally conservation by adding preservatives to keep the extract in time (6 months),
(f) Preferably dilution of the juice of malt sprouts obtained in (d) or (e), preferably in water, with dilution ratio juice of malt sprouts/water ranging from 1/10 to 1/500, and more particularly from 1/10 to 1/200, the ratios 1/100 and 1/200 being the preferred ones.

In a preferred embodiment, a method of preparation of a juice of malt sprouts as defined above, comprises the following steps:
a) Isolation of malt sprouts fractions enriched in anyone of rootlets, acrospires, hulk, dust and mixtures thereof, at the end of the malt drying step;
b) Dilution of theses fractions in acidified water with a ratio malt fractions/water ranging from 1/15 to 1/7, preferably 1/10 with a final pH of the expected juice lower than 4, preferably lower than 2,
c) Diffusion in acidified water between 1 and 5 h, and more particularly between 1 and 2 h, advantageously at temperature 20° C.,
d) Separation (filtration) of the aqueous phase from the solid phase in order to get rid of the insoluble coarse compounds by using a centrifuge and/or a filter plate and/or a filter press and/or a press and/or a filter-candle,
e) Optionally conservation by adding preservatives such as potassium sorbate or/and methyl benzoate to keep the extract in time (6 months),
f) Preferably dilution of the juice of malt sprouts obtained in (d) or (e), preferably in water, with dilution ratio juice of malt sprouts/water ranging from 1/10 to 1/500, and more particularly from 1/10 to 1/200, the ratios 1/100 and 1/200 being the preferred ones.

Isolation and Selection of Fractions

The malt sprouts fractions enriched in anyone of rootlets, acrospires, husk, dust and mixtures thereof, are obtained at the end of the malt drying step.

These selected fractions may be optionally then grinded, for example using a Bauknecht grinder (level 0).

Dilution

The malt sprout fractions are diluted in aqueous phase, preferably in water, in a specific ratio ranging from 1/15 to 1/7, more preferably a ratio of 1/10 (1 malt sprout fraction/9 water) with usual stirred vessels. Lower dilutions require adequate mixing devices.

In a preferred embodiment, the dilution is carried out in acidified water, in particular in presence of sulfuric acid for obtaining a pH lower than 4, preferably lower than 2.

Other acids may be used alternatively, such as notably mineral acids like chlorhydric, sulfuric, nitric, phosphoric acids, or organic acids like formic, acetic, propionic, lactic acids and mixture thereof.

Diffusion

The temperature of the diffusion reaction is ranging from 20 to 60° C., in particular from 20 to 30° C. Preferably, the diffusion is made for 1 h at 20° C.

Separation

The separation of the aqueous phase from the solid phase in order to get rid of the coarse insoluble compounds uses a centrifuge and/or a filter plate and/or a filter press and/or a press and/or a filter-candle.

Conservation

In order to keep in time the juice of malt sprout, for example 6 months, an additional step of conservation is carried out, by adding at least one preservative, such as sorbate and benzoate.

In a preferred embodiment, are used as preservatives potassium sorbate and/or methyl benzoate.

Additional Dilution

The juice of malt sprouts may be used as such, or advantageously further diluted, preferably in water, with dilution ratio juice of malt sprouts/water ranging from 1/10 to 1/500, preferably 1/100 or 1/200 which showed very good performances as biostimulant and plant growth.

The juice of malt sprouts according to the invention comprises:
(i) nitrogen content higher than 2,5% by weight of dry matter;
(ii) free amino nitrogen content higher than 0,3% by weight of dry matter; and (iii) nucleic acid derivatives content higher than 0.1% by weight of dry matter.

It may advantageously comprise additionally at least one compound selected from:

Antioxydants, in particular glutathion,

Enzymes, in particular selected from amylases, phosphodiesterases and mixtures thereof, Carbohydrates, Proteins, Soluble fibers, B vitamins and minerals, And mixtures thereof.

The presence in the juice of malt sprouts according to the invention of vitamins, nutrients and growth factors, has very interesting functional consequences in plant growth and plant natural defense, and in particular an improved plant physiological state: the plant with the environmental factors essential to its development improves its anabolic balance sheet and thereby less energy for its development or multiplication.

In a particular embodiment, the malted cereal is selected from barley, wheat, rye, spelt, corn, millet sorghum, oat, triticale, rice and mixtures thereof, preferably barley.

In a preferred embodiment, the juice of malt sprouts is obtained from an aqueous extraction of malt sprouts fractions of barley comprising a content higher than 50%, preferably higher than 60%, more preferably a range from 65 to 85% of rootlets and acrospires by total weight of malt sprout fractions.

The juice of malt sprouts is obtained from an aqueous extraction, preferably an acidified aqueous extraction. The acid is advantageously sulfuric acid.

In a preferred embodiment, the juice of malt sprouts is further diluted, preferably in water, with dilution ratio juice of malt sprouts/water ranging from 1/10 to 1/500, preferably 1/100 or 1/200.

The juice of malt sprouts and composition comprising it may optionally include one or more adjuvants. An adjuvant may enhance or improve herbicidal and/or plant growth performance, for example. Adjuvants may be added to the composition at the time of formulation, or by the applicator to a mix prior to treatment. Adjuvants include, for example, surfactants (emulsifier), crop oil, fertilizers, dispersing agents, compatibility agents, foaming activators, foam suppressants, correctives, and spray colorants (dyes). An adjuvant may be present in any desired amount to ensure stability and ease of use.

The juice of malt sprouts according to the invention may be used as such or in the form of formulations. Non-limiting examples of formulations include solutions, emulsions, suspensions, and aerosol.

In a particular embodiment, the juice of malt sprouts is used in combination with an additional plant growth stimulant or promoter and/or an additional and/or natural plant defense stimulant or promoter.

It can be applied in the form of ready mixes. The juice of malt sprouts can also be formulated individually and mixed upon use, i.e. applied in the form of tank mixes. The juice of malt sprouts can be used as such or in the form of their formulations, and furthermore also as mixtures with plant growth stimulants, ready mixes or tank mixes. Compositions may also be mixed with other active compounds, such as herbicides, fungicides, insecticides, acaricides, nematicides, bird repellents, growth substances, plant nutrients and agents which improve soil structure.

Uses as Biostimulant

A first use of the juice of malt sprouts according to the invention is the use as a biostimulant agent.

In a particular embodiment, the juice of malt sprouts according to the invention is used in methods for stimulating or promoting plant growth.

The juice of malt sprouts whose use is proposed gives a consistent increase in weight of the aerial and root parts of plants and a consistent increase in the chlorophyll content of plants, indicating better assimilation of the available elements. The juice of malt sprouts whose use is proposed therefore activates the growth of the plants that are treated.

In another particular embodiment, the juice of malt sprouts according to the invention is used in methods for stimulating natural plant defenses.

In another particular embodiment, the juice of malt sprouts according to the invention is used in methods for treating seeds or plants.

The inventors have demonstrated that the juice of malt sprouts has positive effect on the production of biomass and content of chlorophylls. The juice of malt sprouts according to the invention may confer a better nutrient absorption, confers a better crop quality, improves tolerance to biotic and/or abiotic stresses, improve nitrogen uptake by plants, enhances plant height, leaf area, biomass, plant vigor, or combination thereof.

The juice of malt sprouts according to the invention may also improve the ecologically important soil life, by strengthening the plant and enhancing its health, improving the soil conditions with humus producing substance, vitalising the plant during the entire growing period, nutritioning the plant gently by slow-flowing nutrients, and giving a high yield capacity through nutrient compositions provided to the plant.

Another object of the invention is a method for stimulating or promoting plant growth and/or for improving the natural plant defense, which comprises the application on said plants, in particular by spraying, of a composition comprising a juice of malt sprouts as defined above in an amount sufficient to stimulate or promote plant growth.

In particular, the amount sufficient to stimulate or promote plant growth and/or to improve the natural plant defense is in a range from about 1 grams per hectare to about 1000 grams of malt sprouts extract (dry matter d.m. or active ingredient, a.i.) per hectare.

According to a particular embodiment of the method, according to the invention, the juice of malt sprout of aqueous composition containing it, is applied by foliar spraying or by infiltration. Spraying can be carried out throughout the growth of the plant, at least once weekly, preferably two to three times weekly.

The application doses and the application conditions depend of course on the plant species to be treated, and its stage of development.

The plant to be treated, may be chosen from the group consisted of plant crops, ornamentals, trees, grasses, annuals, perennials or any other commonly cultivated member of the kingdom Plantae, preferably plant crops and in particular wheat. Non limitative examples or such plants are disclosed above in the disclosure.

The term "plant" according to the invention covers plant crops, ornamentals, trees, grasses, annuals, perennials or any other commonly cultivated member of the kingdom Plantae.

The term "crop plant(s)" according to the invention includes any edible or non-edible plant, including decorative, plant species with commercial value, which is planted and cultivated for commercial use. Thus, crop plants include floral and non-floral plants, perennials and annuals, trees, shrubs, vegetable plants, fruit trees, turf, and ground cover. Non-limiting specific examples of crop plants include wheat, corn, soybean, dry bean, cotton, cereals, rice, maize, sorghum, canola, soya, barley, potato, sweet potato, sunflower, rye, oats, sugar beet, safflower, alfalfa, cassava, cucurbits, pineapple, pastures, canola, flax, peas, lentils, beans, linola, mustard, chickpeas, seedling alfalfa, onions, soybeans, turf grass, stone fruits (cherries, plums, apricots, peaches, nectarines), blueberries, mangos, avocados, pastures, turfgrass, ornamentals, tree crops, eucalyptus, pine, tea, coffee, nut trees, citrus, tropical fruits, pome fruits, grapes and vines, perennial grasses, caneberries, bananas, or sugarcane.

The term "plants" is meant to include germinant seeds, cuttings, emerging seedlings, and established vegetation, including roots and above-ground portions, for example, leaves, stalks, flowers, fruits, branches, limbs, root, and the like.

According to the invention, ornamental plants are plants that are grown for decorative purposes in gardens and landscape design projects, as houseplants, for cut flowers and specimen display. The cultivation of these, called floriculture, forms a major branch of horticulture.

According to the invention, annuals are plants that perform their entire life cycle from seed to flower to seed within a single growing season. All roots, stems and leaves of the plant die annually. Only the dormant seed bridges the gap between one generation and the next.

According to the invention, perennials are plants that persist for many growing seasons. Generally the top portion of the plant dies back each winter and regrows the following spring from the same root system.

In a preferred embodiment, the plant is a crop plant, in particular monocotyledonous crop including rice, corn, sorghum, millet, wheat, barley, oats, rye and triticale, and preferably wheat.

In a particular embodiment, the application on plants is carried out pre-emergence, post-emergence or both.

In some embodiments, the applying step is carried out post-emergence. In some embodiments, post-emergence comprises seedling stage of the crop plant. In some embodiments, the applying step is carried out pre-emergence. In some embodiments, application of the compositions disclosed herein may be performed both pre- and post-emergence. In some embodiments, the applying step can be applied at any growth stage, including but not limited to, pre-emergence, early post emergence, and later stages of a crop growth cycle.

The methods herein may complement the spectrum of weed control and may be combined with other biostimulants/plant growth regulators (seed treatment) in a starter kit.

In some embodiments, stimulating or promoting plant growth is assessed by enhanced seedling germination, plant height, leaf area, biomass, plant vigor, plant color, or combinations thereof. One or more of these characteristics can be measured by conventional means. Others may be assessed by visual observation.

In another embodiment, the juice of malt sprouts may be used in methods for stimulating germination of plant grains or seedlings.

In particular, they can be used to activate or control the development of germination or the development of seedlings. They have agricultural or industrial applications, including malting or for the production of sprouts for nutritional purposes.

The use of this extract will make it possible to use smaller amounts of fertilizers, giving an increase in yields. In biological culture, the use of this extract will allow the partial or complete disappearance of manures or chemical fertilizers.

FIGURES

FIG. 1: Graph representation of the effect of different products (juices of malt sprouts and positive control) on wheat plants growth by measuring fresh matter of wheat plants.

Figure 2:
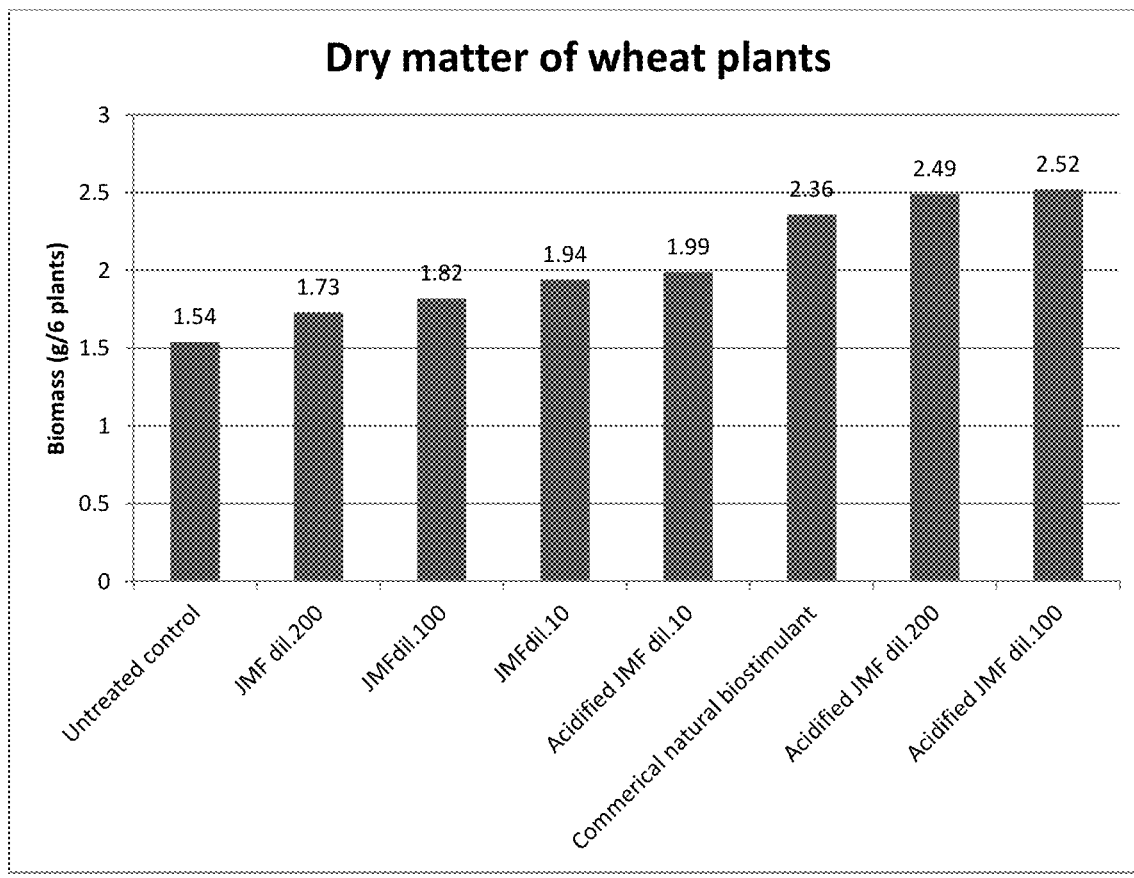

FIG. 2: Graph representation of the effect of different products (juices of malt sprouts and positive control) on wheat plants growth by measuring dry matter of wheat plants.

Figure 3:
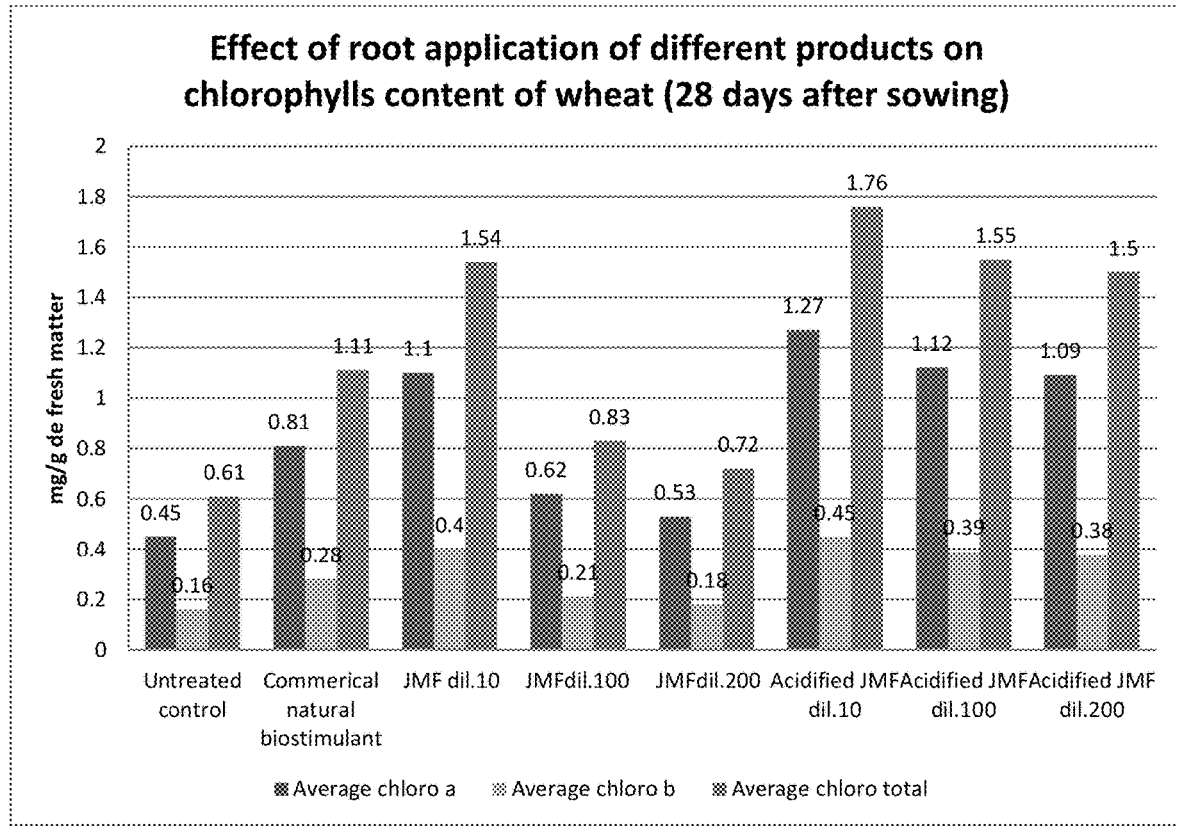

FIG. 3: Graph representation of the effect of different products (juices of malt sprouts and positive control) on wheat plants growth by measuring chlorophylls contents of wheat.

FIG. 4; Schematic illustration of malt sprouts, with (1) representing an acrospire (=germ), (2) representing rootlets, (3) representing the husk (=hull), (4) representing a malted barley grain. A malt sprout is constituted of a mix of (1)+(2)+(3)+malt dust.

The following examples illustrate the invention without limiting the scope thereof. Unless otherwise stated, the percentages are expressed by weight. The ratio are expressed in weight ratio.

EXAMPLES

Example 1: Preparation of the Juice of Malt Sprouts (Malt Sprouts—Extracted Juice)

The mix of malt sprout fractions used to produce the juice is characterized below:

TABLE 1

Physical characterization of malt fractions used for the examples 1 and 2.
Malt sprout fractions (MF) - Physical characterization

| From crop | 2014 |
|---|---|
| Fractions composition (in %) | |
| Husk + whole grains | 10 |
| Acrospires | 12 |
| Rootlets | 60 |
| Dust | 18 |

TABLE 2

Physico-chemical analysis of malt fractions used for the examples 1 and 2
Physico-chemical analysis of Malt sprout Fractions (MF)

| Malt fractions blend | Units | Values |
|---|---|---|
| Moisture | % | 5.4 |
| Total nitrogen | g/100 g | 4.08 |
| Total protein | | 25.5 |
| Total fibers | | 53.13 |
| From which insoluble fibers | | 50.77 |
| From which soluble fibers | | 2.35 |
| Starch | | 4 |

During this first experimental step, various extraction processes were tested in order to determine the optimum extraction process.

Different extraction procedures were tested with the malt fractions as described above:

TABLE 3

| | Process used to produce the juice | Stabilization of the juice | Further Dilution applied |
|---|---|---|---|
| JMF dil. 10 | >MF + tap water (ratio 1:10) | Addition of preservatives: potassium sorbate (3 g/liter of juice) and or methyl benzoate (5 g/liter of juice) | 1/10 |
| JMF dil. 100 | >Diffusion during 1 h at 20° C. | | 1/100 |
| JMF dil. 200 | >No pH adjustment - native pH = 6 | | 1/200 |
| Acidified JMF dil. 10 | >MF + acidified water (ration 1:10) | | 1/10 |
| Acidified JMF dil. 100 | >Diffusion during 1 h at 20° C. | | 1/100 |
| Acidified JMF dil. 200 | | | 1/200 |

JMF = Juice Malt Fraction (Juice of malt sprout)
MF = Malt Fraction

Witnesses:
Negative control: without product (referenced in the figures as 'untreated control')
Positive control: commercial natural biostimulant
The process for extracting the juice of malt sprouts (also named juice of malt fraction JMF) according

| | Process used to produce the juice | Stabilization of the juice | Further Dilution applied |
|---|---|---|---|
| JMF dil.10 | MF + tap water (ratio 1:10) | Addition of preservatives: potassium sorbate (3 g/liter of juice) and or methyl benzoate (5 g/liter of juice) | 1/10 |
| JMF dil.100 | Diffusion during 1 h at 20° C. | | 1/100 |
| JMF dil.200 | No pH adjustment - native pH = 6 | | 1/200 |
| Acidified JMF dil.10 | MF + acidified water (ration 1:10) | | 1/10 |
| Acidified JMF dil.100 | Diffusion during 1 h at 20° C. | | 1/100 |
| Acidified JMF dil.200 | | | 1/200 | to these conditions comprises the following steps:
 a) Isolation of malt sprouts fractions described in the above Tables 1 and 2;
 b) Dilution of theses fractions in aqueous solvent according to the different variable conditions, with a ratio malt fractions (MF)/water of 1/10, (detailed in Table 3).
 c) Diffusion in acidified water, or in tap water during 1 h, at temperature 20° C.
 d) Separation (filtration) of the aqueous phase from the solid phase by using a Buchner filtration (100 μm).
 e) Conservation by adding following preservatives potassium sorbate (3 g/liter) and methyl benzoate (5 g/liter) to keep the extract in time (6 months),
 f) Additional Dilution of the juice of malt sprouts from 1/10 to 1/200.

Example 2: Evaluation of the Malt Extracts on Plant Growth

The different products obtained in example 1 were then tested on wheat seedlings to evaluate their performance as biostimulants.
They are applied on wheat plants and evaluated according to the following conditions: Dose for each application: 250 ml
Application method: root
1st application: 15 days after sowing
5 treatments (every 2 days for 8 days)
Biological evaluation: the inventors observed general appearance of the wheat plant, fresh and dry biomass (FIGS. 1 and 2), and content of chlorophylls (FIG. 3).

As shown in the FIGS. 1 to 3, it may be noted from the various parameters of biological evaluation that the most favorable conditions are found following application of the juice of malt sprouts obtained by extraction with acidified water and an additional dilution of the juice of malt sprouts at 1/100 or 1/200.

This product appears to have a higher positive effect than the commercial natural reference.
The process for extracting the malt fractions and preparation of the juice of malt sprout that has been identified as the most effective for this application is the solid/liquid extraction by acidified water comprising the following steps:
 a) Isolation of malt sprouts fractions enriched in anyone of rootlets, acrospires, hulk, dust and mixtures thereof, at the end of the malt drying step;
 b) Dilution of theses fractions in acidified water with a ratio malt fractions/water ranging from 1/15 to 1/7, preferably 1/10 with a final pH of the expected juice <2, the acid used being sulfuric acid,
 c) Diffusion in acidified water between 1 and 5 h, and more particularly between 1 and 2 h at temperature 20° C.
 d) Separation (filtration) of the aqueous phase from the solid phase in order to get rid of the insoluble coarse compounds by using a centrifuge and/or a filter plate and/or a filter press and/or a press and/or a filter-candle,
 e) Conservation by adding preservatives such as potassium sorbate or methyl benzoate to keep the extract in time (6 months),
 f) Preferably dilution of the juice malt sprouts, preferably in water, with dilution ratio juice of malt sprouts/water ranging from 1/10 to 1/500, and more particularly from 1/10 to 1/200, the ratios 1/100 and 1/200 being the preferred ones.

These results show the advantage of using juices of malt sprouts-, preferably diluted, as a biostimulant agent or for preparing a biostimulant agent, for the plant nutrition, plant growth, natural plant defense and stimulation of plant seedlings.

Example 3: Malt Sprout Fraction Extract Used as Biostimulant to Activate Plant Seed Growth 1. Malt Sprout Fraction Characterization The malt sprout fraction used to prepare the acidified malt sprout fraction extract is characterized in Table 4 below:

TABLE 4

Physico chemical characterization of malt sprout fraction used in examples 3 and 4. Physico-chemical analysis of Malt sprout Fractions (MSF)

| Batch no1611 | Units | Values |
|---|---|---|
| Dry matter | % | 93.1 |
| Total nitrogen | % dm | 5.7 |
| Total protein (N*6, 25) | | 35.4 |

2. Malt Sprout Fraction Extract Preparation

Process used to prepare the acidified malt sprout fraction extract as described below:
a) Isolation of malt sprouts fraction described in the above Table 4;
b) Dilution of the malt sprout fraction in acidified water with a ratio malt sprout fractions (MSF)/water of 1/10. The acidified water is composed of water and sulfuric acid and has a pH=2.
c) Diffusion in acidified water during 1 h, at 20° C.
d) Separation of the aqueous phase from the solid phase by using a Buchner filtration (100 μm), recovery of the aqueous phase constituting the malt sprout fraction extract.
e) Conservation of the malt sprout fraction extract by adding following preservatives potassium sorbate (3 g/liter) and methyl benzoate (5 g/liter) to keep the extract over time (6 months),
f) To be applied on plant seeds and used as biostimulant, the acidified malt sprout fraction extract is then further diluted in water at a 1/200 dilution.

3. Plant Seeds Treatment with Malt Sprout Fraction Extract (Biostimulant).

The acidified malt sprout fraction extract (AMSFE) is tested as a biostimulant agent to treat plant seeds in order to demonstrate its plant growth stimulator effect at laboratory scale (versus two negative controls: water and a standard malt sprout extract).

Plant seeds treated are:

*Arabidopsis*, cucumber, rapeseed, sunflower, soya, bean, alfalfa, tomato

Corn, wheat, barley, leek

The seeds are treated through direct incorporation of biostimulant in an agar medium, or by directly steeping the seeds into juice of malt sprouts during 2 weeks.

These experiments demonstrate that most of the growth of the different seeds are stimulated by the AMSFE (vs negative controls). The results show a higher length and weight of root system and the leaf area biomasses.

Example 4: Malt Sprout Fraction Extract Used as Biostimulant to Stimulate Wheat Growth Culture The acidified malt sprout fraction extract used in this example is the same than for example 3. Using the same malt sprout fraction as described in Table 4 and the same process of preparation.

The acidified juice of malt sprouts is used as biostimulant to treat wheat culture parcels in open-field in the French Champagne area.

The treatment plan used is:

TABLE 5

Treatment plan applied on wheat plants

Treatments done at the following wheat growing stage Cereal growing stages are defined in Cereals Witzenberger et al., 1989; Lancashire et al., 1991 Phenological growth stages and BBCH-identification keys of cereals

| Products | 2 leaves unfolded (stage BBCH 12) | First node at least 1 cm above tillering node (stage BBCH 31) | Beginning of heading: tip of inflorescence emerged from sheath, first spikelet just visible (stage BBCH 51) |
|---|---|---|---|
| Control | water | water | water |
| AMSFE | 1 | 1 | 1 |
| (liter of AMSFE | 2 | 2 | 2 |
| diluted at | 3 | 3 | 3 |
| 1/200/hectare) | 9 | water | water |

The acidified juice of malt sprouts according to the invention are diluted (1/200) and applied on wheat plants at three different stages of wheat growth, as defined in Table 5.

The results show that the applications of the acidified juice of malt sprouts on wheat plants allow to stimulate wheat growth, especially by increasing plant vigor and increasing final biomass.

Example 5: Malt Sprout Fraction Extract Used as Biostimulant to Stimulate Corn Growth Culture The acidified malt sprout fraction extract used in this example is the same than for examples 3 and 4. Using the same malt sprout fraction as described in Table 4 and the same process of preparation.

The acidified juice of malt sprouts is used as biostimulant to treat corn culture parcels in open-field in three different French regions. It is diluted (1/200) and applied on corn plants at three different stages of corn growth.

TABLE 6

Treatment plan applied on corn plants

Treatments done at the following corn growing stage Maize Weber and Bleiholder, 1990; Lancashire et al., 1991 Phenological growth stages and BBCH-identification keys of maize (*Zea mays* L.)

| Products | 2 leaves unfolded (stage BBCH 12) | First node detectable (stage BBCH 31) | Beginning of tassel emergence: tassel detectable at top of stem (stage BBCH 51) |
|---|---|---|---|
| Control | water | water | water |
| AMSFE | 1 | 1 | 1 |
| (liter of AMSFE | 2 | 2 | 2 |
| diluted at | 3 | 3 | 3 |
| 1/200/hectare) | 9 | water | water |

The results show that the applications of the acidified juice of malt sprouts on corn plants allow to stimulate corn vigor and growth, especially by increasing final yield (tons/hectare).

The invention claimed is:

1. A malt sprouts fraction extract for stimulating plant growth, wherein the malt sprouts fraction extract comprises at least 0.5%, and less than 5% of dry matter by total weight of the malt sprouts fraction extract and comprising at least:
   total nitrogen content from 25 to 60 g/kg of dry matter;
   free amino nitrogen content from 3 to 10 g/kg of dry matter;
   nucleic acid derivatives content from 2 to 5 g/kg of dry matter;
   total free auxin content between 500 and 8000 ng/g of dry matter;
   total gibberellin content between 0.1 and 3.2 ng/mg of dry matter; and
   total cytokinins content between 10 and 400 ng/g of dry matter;
   said malt sprouts extract having been obtained from an acidified aqueous extraction of the malt sprout fraction.

2. The malt sprouts fraction extract according to claim 1, wherein the malt sprouts fraction extract is derived from a plant selected from the group consisting of barley, wheat, rye, spelt, corn, millet sorghum, oat, triticale, rice and mixtures thereof, and obtained from an acidified aqueous extraction of said plant obtained by a sieving process and comprising a content of rootlets and acrospires higher than 50%, or higher than 60%, or higher than 65% or between 65% and 85% by total weight of fractions.

3. The malt sprouts fraction extract according to claim 1, wherein the malt sprouts fraction extract is derived from a plant selected from the group consisting of barley, wheat, rye, spelt, corn, millet sorghum, oat, triticale, rice and mixtures thereof, and obtained from an acidified aqueous extraction of said plant obtained by a sieving process and comprising a content of rootlets and acrospires higher than 50%, or higher than 60%, or higher than 65% or between 65% and 85% by total weight of fractions,
   obtained from an aqueous extraction of said plant comprising at least:
      dry matter by total weight of the plant from 92% to 98%,
      crude protein content from 25 to 37 g/100 g of dry matter, and
      free amino nitrogen content from 100 to 600 mg/100 g of said plant.

4. The malt sprouts fraction extract according to claim 1, wherein the malt sprouts fraction extract is derived from a plant selected from the group consisting of barley, wheat, rye, spelt, corn, millet sorghum, oat, triticale, rice and mixtures thereof, and obtained from an acidified aqueous extraction of said plant obtained by a sieving process and comprising a content of rootlets and acrospires higher than 50%, or higher than 60%, or higher than 65% or between 65% and 85% by total weight of fractions,
   obtained from an aqueous extraction of said plant comprising at least:
      dry matter by total weight of the malt sprouts from 92% to 98%,
      crude protein content from 25 to 37 g/100 g of dry matter, and
      free amino nitrogen content from 100 to 600 mg/100 g of malt sprouts,
   and containing:
      total fibers content from 43 to 52 g/100 g of dry matter,
      total carbohydrates content from 7 to 12 g/100 g of dry matter,
      total sugars content from 4 to 6 g/100 g of dry matter,
      fats content below 1 g/100 g, and
      ash content from 5 to 7 g/100 g.

5. A malt sprouts fraction extract, wherein
   the malt sprouts fraction extract comprises at least 0.5%, and less than 5% of dry matter by total weight of the malt sprouts fraction extract and comprising at least:
   total nitrogen content from 25 to 60 g/kg of dry matter,
   free amino nitrogen content from 3 to 10 g/kg of dry matter,
   nucleic acid derivatives content from 2 to 5 g/kg of dry matter,
   total free auxin content between 500 and 8000 ng/g of dry matter;
   total gibberellin content between 0.1 and 3.2 ng/mg of dry matter; and
   total cytokinins content between 10 and 400 ng/g of dry matter,
obtained by the method of preparation, comprising the following steps:
   a. diluting isolated malt sprouts fractions in water, to obtain diluted malt sprouts fractions,
   b. diffusing the diluted malt sprouts fractions in aqueous phase, at a temperature from 20° C. to 60° C. in the presence of an acid, or sulfuric acid, to obtain two phases, an aqueous one and a solid one,
   c. optionally, separation of an aqueous phase from a solid phase to obtain a juice of malt sprouts,
   d. optionally, addition of preservatives.

6. The malt sprouts fraction extract wherein the malt sprouts fraction extract comprises at least 0.5%, and less than 5% of dry matter by total weight of the malt sprouts fraction extract and comprising at least:
   total nitrogen content from 25 to 60 g/kg of dry matter,
   free amino nitrogen content from 3 to 10 g/kg of dry matter,
   nucleic acid derivatives content from 2 to 5 g/kg of dry matter,
   total free auxin content between 500 and 8000 ng/g of dry matter;
   total gibberellin content between 0.1 and 3.2 ng/mg of dry matter; and
   total cytokinins content between 10 and 400 ng/g of dry matter,
obtained by the method of preparation recited in claim 5, comprising the following steps:
   a. diluting isolated malt sprouts fractions in acidified water with a ratio malt sprouts fractions/water ranging from 1/15 to 1/4, or 1/10 with a final pH lower than 4, to obtain diluted malt sprouts fractions,
   b. diffusing the diluted malt sprouts fractions in acidified water between 1 and 5 h, or between 1 and 2 h, at a temperature from 20° C. to 60° C.,
   c. Optionally, separation of an aqueous phase from a solid phase in order to get rid of the insoluble coarse compounds by using a centrifuge and/or a filter plate and/or a filter press and/or a press and/or a filter-candle, to obtain a juice of malt sprouts,
   d. Optionally, addition of preservatives.

7. A method for stimulating or promoting plant growth and/or for improving the natural plant defense, or for treating seeds or plants, comprising the application on plants of a malt sprouts fraction extract, said malt sprouts fraction extract having been obtained from an acidified aqueous extraction of malt sprout fraction or a juice of malt sprouts, said juice of malt sprouts comprising acidified water and malt sprouts fraction extracts, comprising rootlets and acrospires in a ratio malt sprout fractions/water ranging from 1/4 to 1/15, or from 1/8 to 1/10, said malt sprout extract comprising at least 0.5%, and less than 5% of dry matter by total weight of the malt sprouts fraction extract and comprising at least:

total nitrogen content from 25 to 60 g/kg of dry matter, free amino nitrogen content from 3 to 10 g/kg of dry matter, nucleic acid derivatives content from 2 to 5 g/kg of dry matter, total free auxin content between 500 and 8000 ng/g of dry matter;

total gibberellin content between 0.1 and 3.2 ng/mg of dry matter; and total cytokinins content between 10 and 400 ng/g of dry matter.

8. The method according to claim 7, wherein the malt sprouts fraction extract is obtained by a method of preparation comprising the following steps:
   a. isolating malt sprouts fractions,
   b. diluting the fractions in water,
   c. diffusing the fractions in aqueous phase, at a temperature from 20° C. to 60° C. in the presence of an acid, or sulfuric acid,
   d. separating an aqueous phase from a solid phase, and
   e. Optionally, addition of preservatives, or sorbate and benzoate.

9. The method according to claim 7, wherein the malt sprouts fraction extract is obtained by a method of preparation comprising the following steps:
   a. isolating malt sprouts fractions,
   b. diluting the fractions in acidified water with a ratio malt sprouts fractions/water ranging from 1/15 to 1/7, with a final pH lower than 4,
   c. diffusing the fractions in acidified water between 1 and 5 h, or between 1 and 2 h, or at a temperature from 20° C. to 60° C.,
   d. separating an aqueous phase from a solid phase in order to get rid of the insoluble coarse compounds by using a centrifuge and/or a filter plate and/or a filter press and/or a press and/or a filter-candle,
   e. Optionally, addition of preservatives, or sorbate and benzoate.

10. The method according to claim 7, wherein the juice of malt sprouts is further diluted in acidified water with dilution ratios juice of malt sprouts/water ranging from 1/10 to 1/500.

11. The method according to claim 7, in combination with an additional plant growth stimulant and/or a plant defense stimulant.

12. The method according to claim 7, wherein the malt sprouts fraction extract or the juice of malt sprouts confers an improved nutrient absorption, confers an improved crop quality, improves resistance to biotic and/or abiotic stresses, improves nitrogen uptake by plants, enhances plant height, leaf area, biomass, plant vigor, or combination thereof.

13. The method according to claim 7, comprising the application on said plants by spraying, of a composition comprising the malt sprouts fraction extract, wherein the malt sprouts fraction extract comprises at least 0.5%, and less than 5% of dry matter by total weight of the malt sprouts fraction extract and comprising at least:

total nitrogen content from 25 to 60 g/kg of dry matter, free amino nitrogen content from 3 to 10 g/kg of dry matter, nucleic acid derivatives content from 2 to 5 g/kg of dry matter, total free auxin content between 500 and 8000 ng/g of dry matter;

total gibberellin content between 0.1 and 3.2 ng/mg of dry matter; and total cytokinins content between 10 and 400 ng/g of dry matter, in an amount in a range from 1 gram to 1000 grams per hectare of dry matter contained in the malt sprouts fraction extract.

14. The method according to claim 7, wherein the plant is chosen from the group consisted of commonly cultivated member of the kingdom Plantae,
   or in the group comprising the Plant SubKingdom of Spermatophytes, or the Phylum of Angiosperms,
   or in group consisted of all families constituting the Phyllum of Angiosperms,
   or in the group selected from the:
      Dicots: *Arabidopsis*, cucumber, rapeseed, sunflower, soya, bean, alfalfa, tomato vine and
      Monocots: Corn, wheat, barley, leek.

15. The method according to claim 7, wherein the application on plants is carried out pre-emergence, post-emergence or both.

* * * * *